US007819291B2

(12) United States Patent
Schulte et al.

(10) Patent No.: US 7,819,291 B2
(45) Date of Patent: Oct. 26, 2010

(54) DISPENSER PUMP

(75) Inventors: Frank Erwin Schulte, Dortmund (DE); Karsten Böhnisch, Kamen (DE); Reinhard Heinrich Neuhaus, Hemer (DE); Cristin Knoblich, Hamburg (DE); Norbert Menzel, Buchholz (DE)

(73) Assignee: Seaquist Perfect Dispensing GmbH, Dortmund (DE)

( * ) Notice: Subject to any disclaimer, the term of this patent is extended or adjusted under 35 U.S.C. 154(b) by 352 days.

(21) Appl. No.: 10/595,405

(22) PCT Filed: Oct. 29, 2004

(86) PCT No.: PCT/EP2004/012304

§ 371 (c)(1), (2), (4) Date: Apr. 14, 2006

(87) PCT Pub. No.: WO2005/042172

PCT Pub. Date: May 12, 2005

(65) Prior Publication Data

US 2007/0045348 A1 Mar. 1, 2007

(30) Foreign Application Priority Data

Oct. 31, 2003 (DE) ................................ 103 51 288

(51) Int. Cl.
*G01F 11/00* (2006.01)

(52) U.S. Cl. .................................... 222/321.9; 222/340

(58) Field of Classification Search .............. 222/321.9, 222/321.7, 321.8, 320, 321.3, 340, 286, 379; D9/448
See application file for complete search history.

(56) References Cited

U.S. PATENT DOCUMENTS 2,721,003 A * 10/1955 Linton ......................... 222/83
4,071,172 A 1/1978 Balogh
4,371,097 A 2/1983 O'Neill
5,156,307 A * 10/1992 Callahan et al. ............. 222/190
5,405,057 A * 4/1995 Moore ................... 222/153.14
5,507,626 A * 4/1996 Yang .......................... 417/258
5,725,128 A * 3/1998 Foster ................... 222/153.13
5,805,216 A 9/1998 Tabei et al.
5,826,756 A * 10/1998 Foster ..................... 222/321.3
6,013,270 A 1/2000 Hargraves et al.
6,015,067 A * 1/2000 Lang et al. ............. 222/153.13
6,302,305 B1 * 10/2001 Bonningue .................. 222/380
6,357,629 B1 * 3/2002 Ding ..................... 222/153.13
6,840,408 B1 * 1/2005 Foster et al. ................ 222/190

(Continued)

FOREIGN PATENT DOCUMENTS

EP 0 806 249 A2 11/1997

(Continued)

*Primary Examiner*—Kevin P Shaver
*Assistant Examiner*—Jonathan Wood
(74) *Attorney, Agent, or Firm*—Roberts Mlotkowski Safran & Cole, P.C.

(57) ABSTRACT

A dispenser pump (1) that has a manually insertable pump shaft (6) which is surrounded by at least three sleeve sections (16, 17, 18) that can be slid into each other in a telescopic manner. A return spring (8) is preferably disposed between pump shaft (6) and the sleeve sections (16, 17, 18). All parts of the dispenser pump (1), which enter in contact with a liquid that is to be pumped, are made of plastic.

10 Claims, 1 Drawing Sheet

U.S. PATENT DOCUMENTS

| | | | | |
|---|---|---|---|---|
| 6,893,232 | B2 * | 5/2005 | Wu | 417/547 |
| 6,910,606 | B2 * | 6/2005 | Martin et al. | 222/321.9 |
| 2003/0150876 | A1 * | 8/2003 | Walters et al. | 222/321.9 |

FOREIGN PATENT DOCUMENTS

| | | | |
|---|---|---|---|
| GB | 2 122 692 | A | 1/1984 |
| WO | WO 99/02446 | A1 | 1/1999 |

* cited by examiner

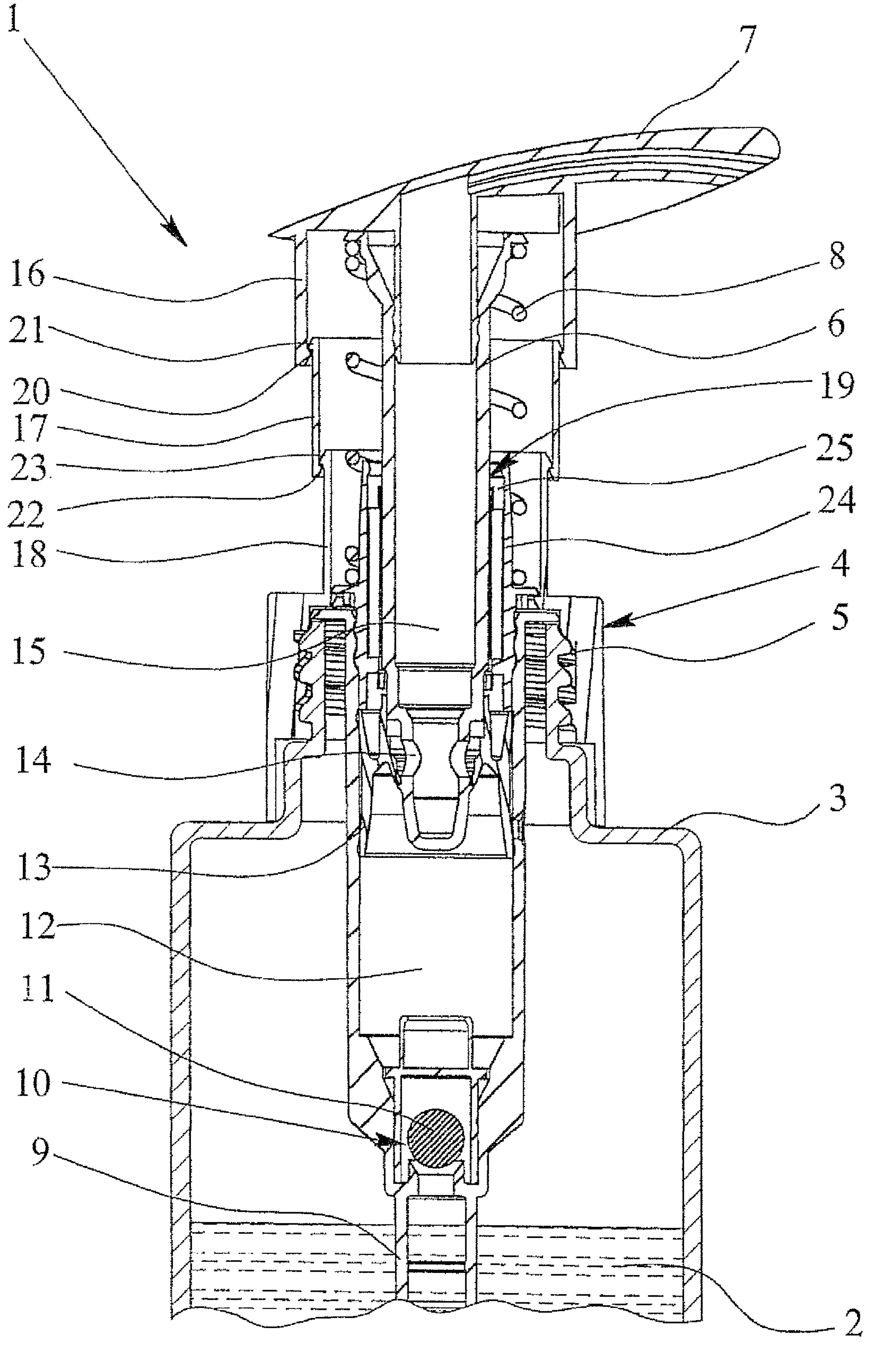
1
7
16
8
21
6
20
19
17
25
23
22
24
18
4
5
15
14
3
13
12
11
10
9
2

DISPENSER PUMP

BACKGROUND OF THE INVENTION

1. Field of the Invention

This invention relates to a dispenser pump for dispensing a liquid from a container of the type having a pump housing which can be attached to the container, a pump shaft which can be moved relative to the pump housing, especially can be manually pressed into it, a dispenser head on the pump shaft.

The term “dispenser pump” is defined especially as a metering pump or manually activated pump for delivery of liquids, such as washing lotions for cleaning the human body, body care products, cleaning products, cosmetics, but also lubricants or the like.

2. Description of the Related Art

European Patent Application EP 0 806 249 B1, upon which this invention is based, discloses a dispenser pump for delivery of liquid from a container. The pump housing can be attached to the container and holds a pump shaft which can be manually pressed into the pump housing against spring force by the user pressing on the dispenser button attached to the pump shaft. Two sleeve sections, which can be pushed into one another, serve as splash protectors and are mounted between the pump housing and the dispenser head. The reset spring is conventionally located in the pump cavity through which the liquid to be pumped flows.

Increasingly aggressive viscous liquids, especially in the form of washing lotions or the like, which are to be delivered by dispenser pumps in increasingly larger metered volumes per pump stroke, have recently been increasingly offered. In order to convey a liquid of higher viscosity with the same operating force per pump stroke and/or to convey a larger amount per stroke, a larger pump stroke is necessary. Reducing the size of the pump stroke with the result of increasing the diameter of the pump cylinder, on the other hand, would have extreme disadvantages or problems in order to be able to intake liquids or other products of higher viscosity and to deliver them with an acceptable expenditure of force.

In the known dispenser pumps, splash protection leads to a superproportional increase of the overall axial height when the pump stroke is increased. Furthermore, it is disadvantageous in the known dispenser pump that very aggressive liquids can attack the metallic reset spring or a metallic check valve.

SUMMARY OF THE INVENTION

The object of this invention is to devise a dispenser pump which is suited for viscous, aggressive liquids, and especially, in which a compact and durable structure with splash protection can be implemented.

The aforementioned object is achieved by a dispenser pump in accordance with the invention.

The first aspect of this invention is that the dispenser pump has at least one additional sleeve section which is connected to the second sleeve section extending toward the pump housing and which can be pushed into the second sleeve so that three or more sleeve sections form a telescopically extendable splash protection around the pump shaft between the pump housing and the dispenser head. Thus, when the pump stroke is increased, the additional overall axial height which is necessary beyond the increase of the pump stroke is greatly reduced compared to the prior art and accordingly enables a compact structure of the dispenser pump. Furthermore a simple and thus economical structure with effective splash protection results.

A second aspect of this invention which can also be implemented independently consists in placing a spring which is intended for resetting the pump shaft radially outside of the pump shaft and/or between the pump housing and the dispenser head, therefore outside of the areas which come into contact with the liquid to be pumped. In this way it is possible to prevent the spring which conventionally is made of metal from being attacked by increasingly aggressive liquids.

Preferably, the check valve, especially its valve ball, is likewise made of plastic. In this way, it is possible to prevent aggressive liquids from attacking the dispenser pump and/or metal ions from being taken up by the liquids and thus contaminating them.

Preferably, all parts of the dispenser pump which come into contact with the liquid have no metal parts, and especially, are made from plastic.

Other advantages, features, properties and aspects of this invention become apparent from the following description of a preferred embodiment with reference to the accompanying drawings.

BRIEF DESCRIPTION OF THE DRAWINGS

The sole FIGURE is a schematic, sectional view of a dispenser pump in accordance with the invention attached to a container which contains the liquid to be pumped.

DETAILED DESCRIPTION OF THE INVENTION

The illustrated dispenser pump 1 is used to deliver a liquid 2, such as a washing lotion for cleaning the human body, a body care product, a cleaning product or the like. The liquid 2 can be especially relatively viscous and/or aggressive.

The container 3 is assigned to the dispenser pump 1; the dispenser pump 1, if necessary, is detachably mounted on it. Thus, for example, replacement of the container 3 and/or replenishment of the liquid 2 can take place.

The dispenser pump 1 has a pump housing 4 which can be attached to the container 3, in the illustrated embodiment, by means of a collar section or threaded section 5 which is preferably directly molded on.

The dispenser pump 1, furthermore, has a pump shaft 6 and a dispenser head 7 which is located on its free end.

The pump shaft 6 can, be pressed in manually against the force of a spring 8 which causes resetting. The spring 8 pretensions the pump shaft 6 with the dispensing head 7 up into the initial position in the representation.

The dispenser pump 1 has an intake fitting 9 which is connected to the liquid 2 to be pumped or which extends into it, with an intake tube or the like which is connected to it (not shown), an inlet or return valve 10 with a valve ball 11, a delivery space 12 and a pump plunger 13.

The pump plunger 13 can be moved back and forth in the delivery space 12 by means of the pump shaft 6, in the illustrated embodiment up and down, and the pump plunger 13 for alternating clearance and closing of the through openings 14 can be moved to a limited degree into the interior 15 of the hollow pump shaft 6 relative to the pump shaft 6 and/or a valve means is implemented in some other way so that when the pump plunger 13 moves up, liquid 2 is taken into the delivery space 12 and when the pump plunger 13 moves down, liquid 2 is pressed or conveyed through the interior 15 of the pump shaft 6 and is delivered by way of the dispenser head 7.

For the details of a possible implementation of the pump mechanism, reference is made in addition to European Patent Application EP 0 806 249 B1 which is hereby incorporated by reference.

The dispenser pump 1 has a first sleeve section 16, a second sleeve section 17 and a bird sleeve section 18 which can be telescopically pushed into or pulled apart from one another and which radially surround the pump shaft 6, spaced apart in the illustrated embodiment.

The first sleeve section 16 extends from the dispenser head 7 toward the pump housing 4 and is especially molded onto or attached to the dispensing head 7.

The first sleeve section 16 extends peripherally over or around the second sleeve section 17 which for its part extends peripherally over or around the third sleeve section 18.

The third sleeve section 18 is held by the pump housing 4, especially is permanently connected to it, preferably molded onto it.

The dispenser pump 1 is conventionally used for a vertical container 3 so that the axis of the pump shaft 6 or of the pump motion runs essentially vertically. The sleeve sections 16, 17, 18, which overlap one another from top to bottom, form effective protection, especially against splashing, but also optionally against dirt or the like, so that penetration of splashes, dirt or the like between the moveable pump shaft 6, which can also optionally be turned, and the pump housing 4 or the slide guide 19 of the pump housing 4 can be effectively prevented for the pump shaft 6.

In order to ensure that the sleeve sections 16 to 18 overlap one another in any axial position of the pump shaft 6, therefore do not slip out completely in the axial direction, the first sleeve section 16, on its free end area adjacent to the second sleeve section 17, has an inner projection 20 which fits behind an outer projection 21 on the second sleeve section 17, and the second sleeve section 17, on its end area adjacent to the third sleeve section 18, has an inner projection 22 which fits behind an outer projection 23 on the third sleeve section 18. The inner projections 20, 22 and/or the outer projections 21, 23 are made preferably as annular shoulders, annular ridges, cone sections or the like, preferably continuously around the periphery, on the one hand, in order to extend underneath with interlocking in the axial direction against axial separation of the sleeve sections 16 to 18, and on the other hand, to form a labyrinth seal for effective protection against splashing or the like.

The annular surfaces of the inner projections 20, 22 and/or of the outer projections 21, 23, which surfaces run onto one another during assembly of the sleeve sections 16, 17, 18, when they are inserted axially into one another, are preferably beveled or made conical in order to form insertion bevels which facilitate assembly so that the sleeve sections 16, 17, 18, can be pushed into one another, especially catching or snapping.

If necessary the inner projections 20, 22 and/or the outer projections 21, 23 can also be made, not continuously over the entire periphery, but optionally only in areas or sections over the periphery.

Instead of the inner projections 20, 22 and/or the outer projections 21, 23, the sleeve sections 16, 17, 18 can also be protected by other structural measures against slipping out completely, for example, by wall-side recesses, individual projections or other measures.

In the illustrated embodiment, the sleeve sections 16, 17, 18, are made preferably essentially hollow-cylindrically with a circular cross section. However, the sleeve sections 16, 17, 18 can also have other cross sectional shapes, for example, a polygonal, elliptical or oval cross section or some other, also irregular cross sectional shape.

The FIGURE shows the dispenser pump 1 with the pump shaft 6 extended, therefore in the initial position. When the dispenser pump 1 is actuated, the user pressing especially on the dispenser head 7, the pump shaft 6 is pushed into the pump housing 4. In doing so, the sleeve sections 16, 17, 18, are pushed into one another or together and overlap one another at least essentially over the same axial length.

The ratio of the overall axial length in the retracted state to the overall axial length of the sleeve sections 16, 17, 18 in the extended state is much smaller than in the prior art so that, for a given pump stroke (difference between the extended state and retracted state), a much smaller overall axial height of the dispenser pump 1 can be implemented compared to the prior art.

The spring 8 is preferably made of metal, especially spring steel, as is conventional. It is made as a helical spring in the illustrated embodiment.

The spring 8 is located radially outside the pump shaft 6 and between the pump housing 4 and the dispenser head 7. Thus, the spring 8 does not come into contact with the liquid 2, in contrast to the prior art. Accordingly, the spring 8 cannot be attacked by aggressive liquids.

The spring 8 is covered by the sleeve sections 16, 17, 18, and thus, is protected against splashing and the like.

The spring 8 is supported, on the one hand, on the dispenser head 7, and on the other, on the pump housing 4.

On the side of the pump housing 4, the spring 8 is preferably slipped onto a guide sleeve 24 which is held by the pump housing 4 and which extends from the pump housing 4 roughly up to the length of the third sleeve section 18 to the dispenser head 7, and in the area of its free end, on the inside holds an annular seal 25 which forms the already mentioned slide guide 19 for the pump shaft 6.

The spring 8 is therefore located in the area of its lower or housing-side end in the annulus between the guide sleeve 24 and the third sleeve section 18, otherwise in the annulus between the pump shaft 6 and the other guide sleeves 16, 17.

The valve 10, especially its valve ball 11, is made preferably of plastic. With a corresponding choice of the plastic it is possible, in this way, to prevent increasingly aggressive liquids 2 from attacking the valve ball 11.

In particular, alt the parts or areas of the dispenser pump 1 which come into contact with the liquid 2 are made from a suitable plastic, so that no metal parts come into contact with increasingly more aggressive liquids 2.

It follows from the aforementioned that the dispenser pump 1 of the invention is suited for delivery of viscous and aggressive liquids 2. The diameter of the delivery space 12 and of the pump plunger 13 which significantly affects the stiffness of the dispenser pump 1 is chosen to be relatively small, especially for viscous or highly viscous liquids 2, in order to enable relatively easy actuation of the dispenser pump 1. In order to achieve the desired delivery amount of preferably at least 2 ml, especially at least 3 ml or more, per pump stroke, the pump stroke is lengthened accordingly. Proceeding from a certain pump stroke an overall axial height or length of the dispenser pump 1 which is much smaller compared to the prior art can be implemented by the sleeve sections 16, 17, 18 which can be pushed telescopically into one another and which are provided as claimed in the invention.

In the illustrated embodiment there are three sleeve sections 16, 17, 18. Of course if necessary there can also be four or more sleeve sections.

Instead of the sleeve sections 16, 17, 18 which are made at least essentially rigid, to protect against splashing, if necessary, there can also be a bellows-like protective element (not shown) or the like.

What is claimed is:

1. Dispenser pump for delivery of liquid from a container, comprising:

a pump housing which is attachable to a container, a pump shaft which is movable relative to the pump housing, a dispenser head on the pump shaft, a first sleeve section which extends from the dispenser head toward the pump housing and radially surrounds the pump shaft, a second sleeve section which extends from the first sleeve section towards the pump housing and which is movable into the first sleeve, the first sleeve section in any axial position of the pump shaft extending peripherally over the second sleeve section, a third sleeve section which extends from the second sleeve section towards the pump housing and which is movable into the second sleeve section, the second sleeve section in any axial position of the pump shaft extending peripherally over the third sleeve section, so that the first, second and third sleeve sections form a telescopically extendable splash protection around the pump shaft between the pump housing and the dispenser head, wherein the first sleeve section has an inner projection which is engageable with the second sleeve section on an end area thereof which is adjacent to the second sleeve section, so that the second sleeve section cannot be pulled out of the first sleeve section, wherein the second sleeve section has an inner projection which is engageable with the third sleeve section on an end thereof in an area adjacent to the third sleeve section, so that the third sleeve section cannot be pulled out of the second sleeve section, wherein the second sleeve section has an outer projection on an end area thereof that is adjacent to the first sleeve area, wherein the third sleeve section has an outer projection on an end area thereof that is adjacent to the second sleeve area, wherein the inner projection of the first sleeve section and the outer projection of the second sleeve section each fit one behind another and the inner projection of the second sleeve section and the outer projection of the third sleeve section fit one behind another, wherein a spring pretensions the pump shaft and is located on a guide sleeve which is held by the pump housing surrounding the pump shaft, the guide sleeve extending towards the dispenser head from the pump housing roughly up to the end area of the third sleeve section, and wherein an annular seal is located in an area of reduced thickness formed on an inner side of the guide sleeve in an area of a free end of the guide sleeve, said annular seal forming a slide guide for the pump shaft.

2. Dispenser pump as claimed in claim 1, wherein the first sleeve section is attached to the dispenser head.

3. Dispenser pump as claimed in claim 1, wherein the third sleeve section is attached to the pump housing.

4. Dispenser pump as claimed in claim 1, wherein the third sleeve section is mounted on a collar of the pump housing.

5. Dispenser pump as claimed in claim 1, wherein at least overlapping areas of all of the sleeve sections are at least essentially the same length when the pump shaft is drawn in.

6. Dispenser pump as claimed in claim 1, wherein all of the sleeve sections are lockable in a position pushed into one another.

7. Dispenser pump as claimed in claim 1, wherein the third sleeve section radially surrounds the guide sleeve at a distance and an annular space is formed therebetween.

8. Dispenser pump as claimed in claim 1, wherein the spring is a helical spring.

9. Dispenser pump as claimed in claim 1, further comprising a valve with a plastic valve ball.

10. Dispenser pump as claimed in claim 1, wherein all parts in a location exposed to liquid being dispensed are made of plastic.

* * * * *